UNITED STATES PATENT OFFICE.

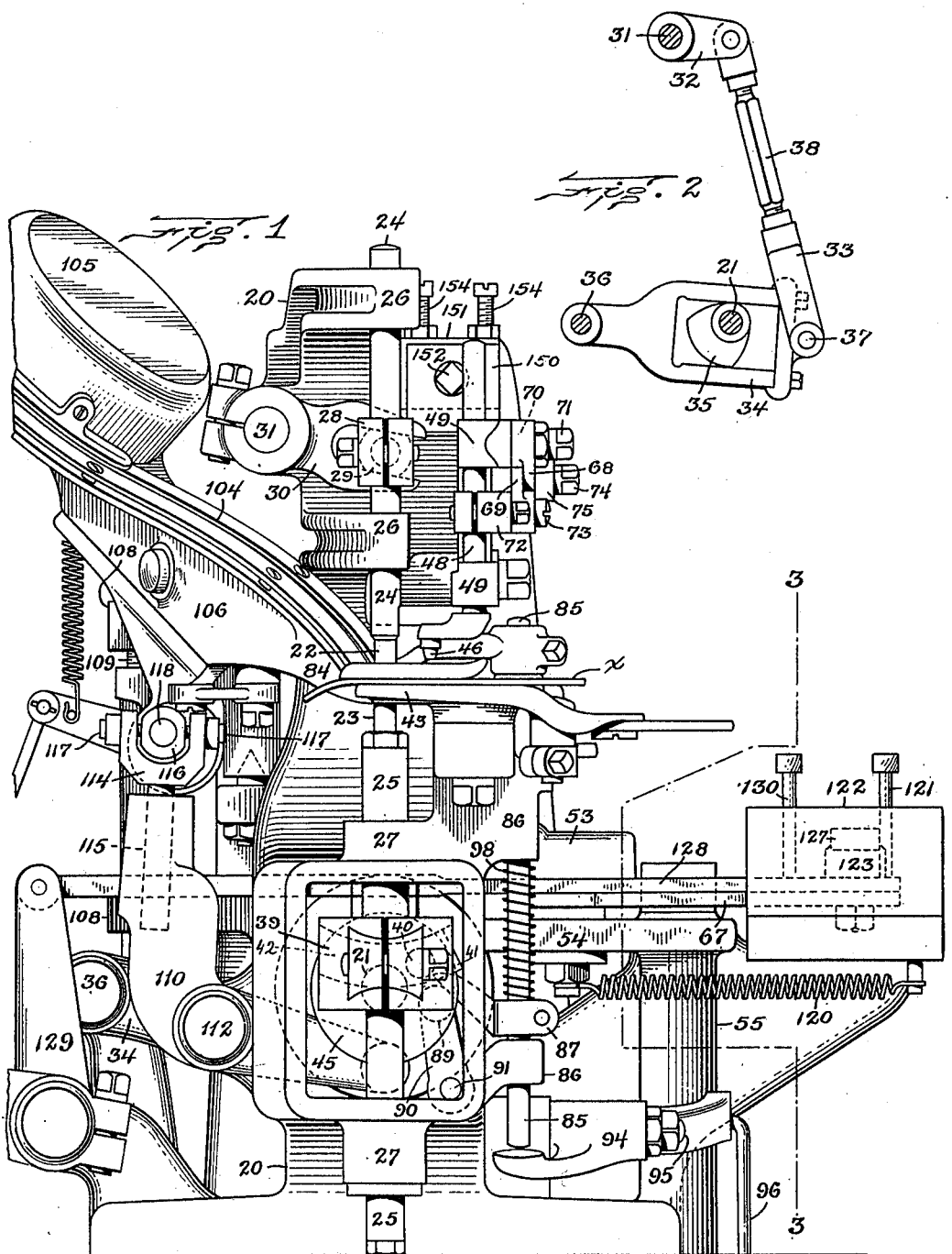

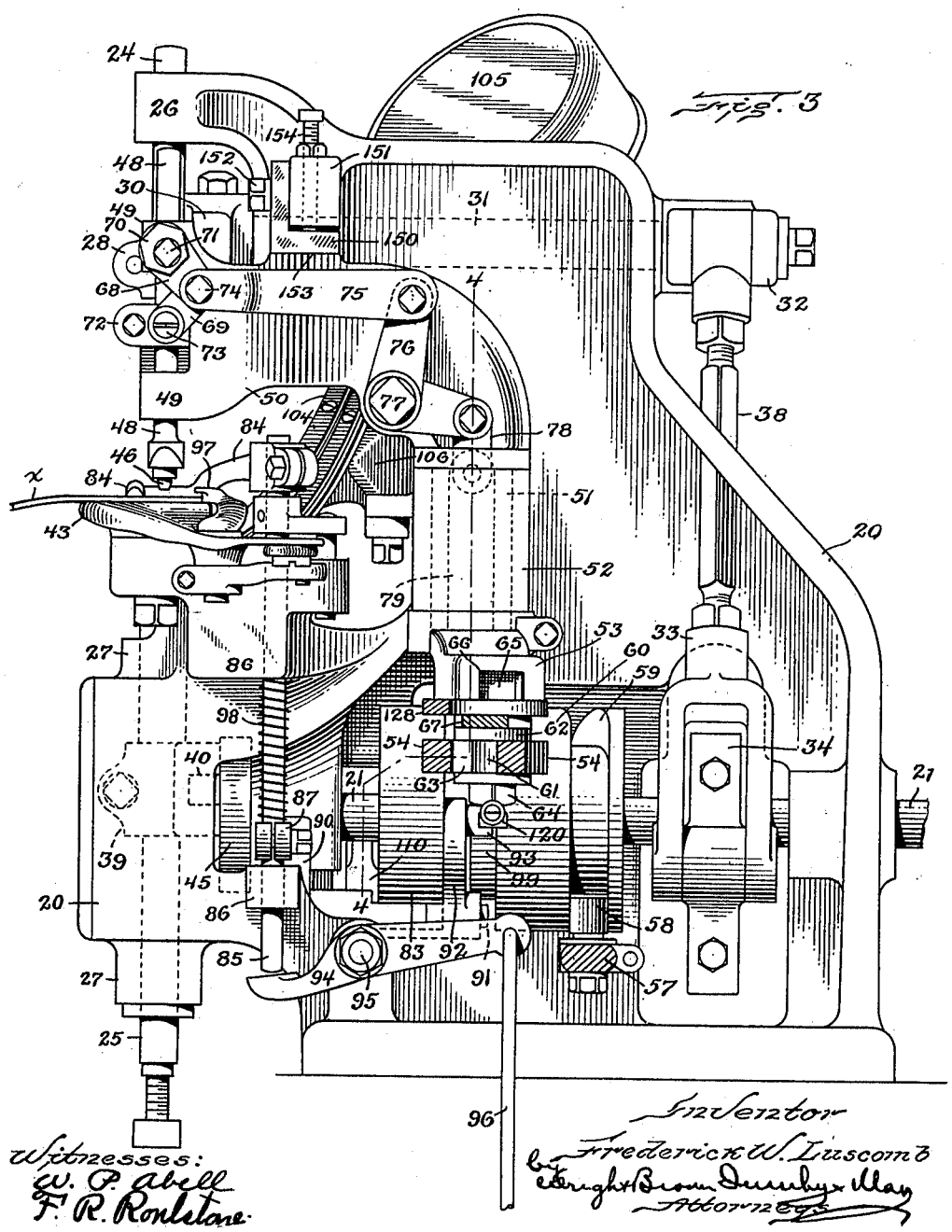

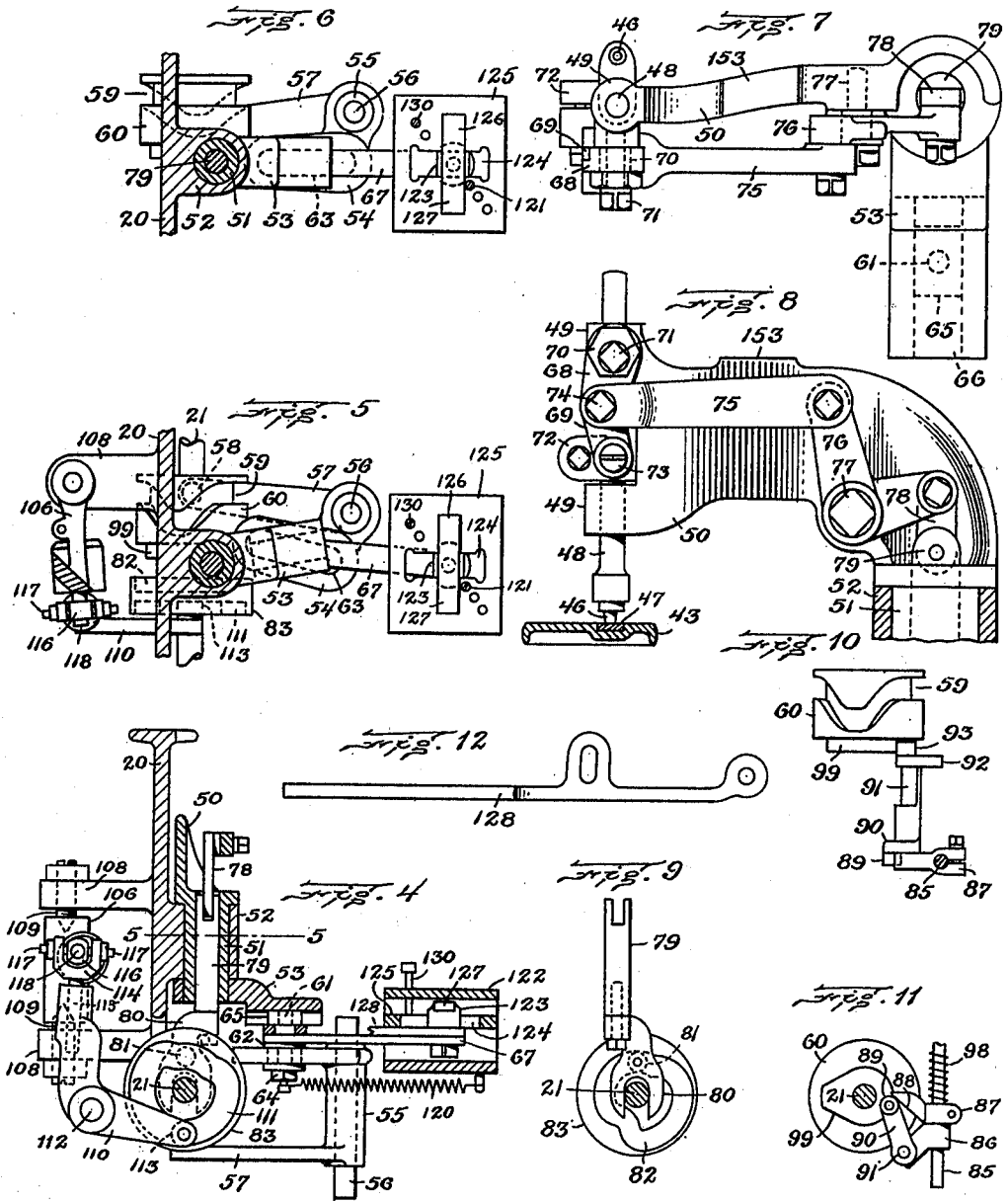

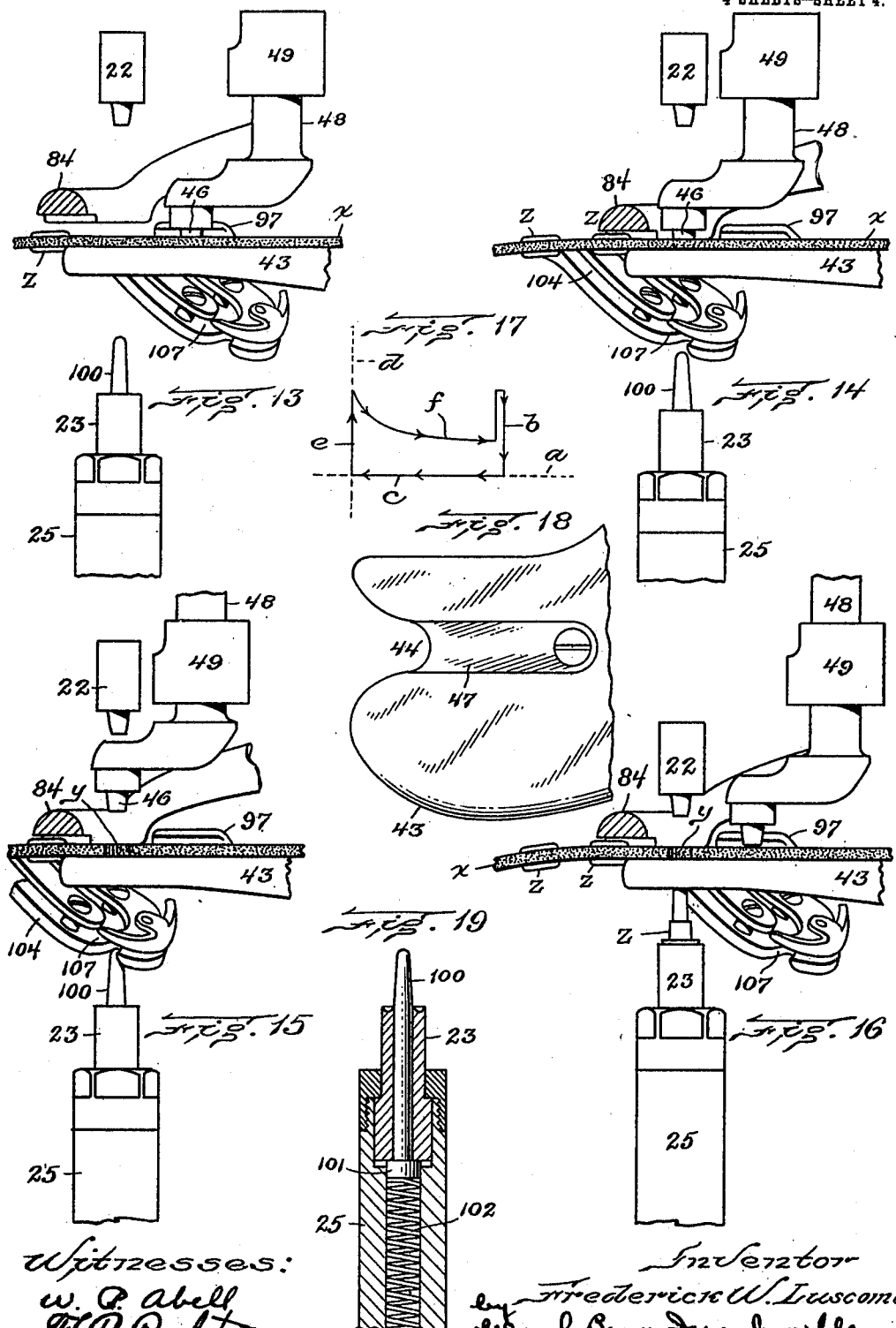

FREDERICK W. LUSCOMB, OF NEW BEDFORD, MASSACHUSETTS, ASSIGNOR TO ATLAS TACK COMPANY, OF FAIRHAVEN, MASSACHUSETTS, A CORPORATION OF NEW JERSEY.

MACHINE FOR INSERTING EYELETS.

978,178.      Specification of Letters Patent.      Patented Dec. 13, 1910.

Application filed December 5, 1908. Serial No. 466,098.

*To all whom it may concern:*

Be it known that I, FREDERICK W. LUSCOMB, of New Bedford, in the county of Bristol and State of Massachusetts, have invented certain new and useful Improvements in Machines for Inserting Eyelets, of which the following is a specification.

This invention relates to machines for inserting and setting eyelets such as shoe eyelets. It has hitherto been the custom to feed the work in such machines by means of one of the eyelet setting members which for this purpose has had a lateral movement to and from alinement with its complemental setting member and enters a hole cut in the work for the eyelet. A serious objection to such movement of the setting member is the liability of losing the alinement of the two setting members when they are pressed together for setting an eyelet. This objection cannot be entirely avoided in any case in which one of the setting members is mounted in a guide or support which is movable. The result when the setting members are not in true alinement is that the eyelet does not enter the hole squarely and one of the setting members instead of entering the throat of the eyelet, crushes the shank on one side so as to destroy not only that eyelet but the piece of work.

If one of the setting members is formed also as a cutting tool for preparing a hole for the eyelet, which is the case in some machines, the hole so cut is invariably smaller than the shank of the eyelet, because the hole can be only as large as the exterior of the cutter, whereas the interior of the shank has to slip over the cutter and the exterior of the shank has to be forced into a hole as small or smaller than its interior. This practice of forcing an eyelet into a hole which is smaller than the eyelet is objectionable in that it produces ragged or uneven work about each eyelet because of the gouging or crowding of the work.

The present invention seeks to avoid these objectionable results by providing setting members which are arranged in undisturbed alinement and which are employed solely for clenching or setting the eyelets. Instead of employing one of the setting members as means for feeding the work, a cutter is employed for preparing a hole for the eyelet and for moving the work laterally so as to leave the hole between and in alinement with the setting members. The chief advantages of so arranging and actuating the setting and the cutting and feeding members are that the setting members, the hole in the work and the eyelet are bound to register and that the hole may be cut as large as required for the shank of the eyelet.

The invention embodies other novel features which are illustrated upon the accompanying drawings, described in the following specification, and pointed out in the claims.

On the drawings, Figure 1 represents a front elevation of one form of eyelet setting machine constructed in accordance with this invention. Fig. 2 represents a vertical section of a portion of the mechanism which actuates one of the setting members. Fig. 3 represents a section on line 3—3 of Fig. 1. Fig. 4 represents a section approximately on line 4—4 of Fig. 3. Fig. 5 represents a section on line 5—5 of Fig. 4. Fig. 6 represents portions of Fig. 5 in other positions. Fig. 7 represents a top plan view of the mechanism which carries the cutting and feeding member. Fig. 8 represents a side elevation thereof. Fig. 9 represents a cam and plunger for actuating the cutter. Fig. 10 represents a top plan view of means for raising the presser foot. Fig. 11 represents a front elevation thereof. Fig. 12 represents a top plan view of a manually operative connecting rod of the work-feeding mechanism. Figs. 13 to 16 represent front elevations of the eyelet inserting and work cutting and feeding members in progressive positions. Fig. 17 represents on a larger scale a chart of the path through which the cutting and feeding member moves. Fig. 18 represents a top plan view of a portion of the cutting table. Fig. 19 represents a vertical section of one of the setting members.

It is to be understood that the invention is not limited to the exact construction illustrated and described, since the latter may be modified in a variety of ways without departing from the spirit and scope of the invention.

The same reference characters indicate the same parts wherever they occur.

Referring now more especially to Figs. 1 and 3, the numeral 20 indicates a frame in which is journaled a rotatable power shaft 21. The shaft may be rotated by any desired means such as, for instance, a clutch pulley and belt (not shown), and is arranged so as to supply the power for actuating the several mechanisms hereinafter described.

22 and 23 represent coöperative compressing or setting members by which the eyelets are inserted singly into the work. Said members are mounted respectively on carriers 24 and 25 shown as cylindrical plungers. The carriers are movable toward and from each other and are mounted in fixed bearings 26, 26 and 27, 27 which are formed in the frame in alinement. Reciprocating motion is imparted to the carrier 24 by means of a split collar 28 clamped thereon, a pivoted block 29 on the collar, a forked arm 30 embracing the block, and a rock-shaft 31 on one end of which the arm is clamped. The rock-shaft is mounted in stationary bearings in the frame 20 and is oscillated (see Fig. 2) by an arm 32 affixed upon its other end. Said arm is connected by a forked connecting rod 33 to a yoked lever 34 which embraces a cam 35 upon the power shaft 21. The lever 34 is fulcrumed upon a stationary stud 36 and is connected to the fork 33 by a stud 37. A turnbuckle 38 inserted between the ends of the connecting rod serves to extend or shorten the rod and so to adjust the range of movement of the carrier 24.

Reciprocating motion is imparted to the carrier 25 by a split collar 39 clamped thereon and a crank pin 40 projecting from a crank disk 45 on one end of the shaft 21. The crank pin extends into a block 41 which is adapted to slide from side to side in a groove 42 formed in the collar. The carrier may be clamped at any position in the collar which would cause its setting member 23 to coöperate with the member 22. In practice both setting members are so adjusted as to meet in the plane of a stationary work rest or table 43 which is cut away at 44 (see Fig. 18) in order to admit the said members.

46 represents a tubular cutter which is adapted to cut a hole in the work $x$. For this purpose a hardened steel plate 47 is inserted in the table and includes the lateral range of movement of the cutter. The cutter is mounted in a carrier 48 which is formed of a cylindrical rod, and which is mounted in bearings 49, 49 in a carriage or hanger 50. The carriage 50 is formed on one end of a cylindrical sleeve 51 which has a bearing in a boss 52 formed on the frame 20. The carriage is adapted to be oscillated about the axis of the sleeve and so to move the carrier 48 laterally toward and from the line of the setting members. The lateral movement of the carrier is combined with movement toward and from the table as hereinafter explained so as to cut and feed the work $x$. The other end of the sleeve 51 is provided with a rigidly attached arm 53 by which the carriage may be oscillated. See Figs. 4 to 7. The arm 53 is connected to an arm 54 formed on one end of a sleeve 55 which is mounted upon a stud 56 affixed to the base of the frame 20. An arm 57 formed on the other end of the sleeve 55 carries a roll 58 which coöperates with a cam groove 59 formed in the periphery of a cylindrical member 60 mounted on the driving shaft 21. The arm 54 when oscillated by the cam 59, imparts movement to the arm 53 to which it is connected by an adjustable stud 61. The stud is formed with a flange or collar 62 between its ends. One end of the stud extends loosely through a slot 63 formed in the arm 54 and is confined by a nut 64 threaded thereon. The other end of the stud carries a block 65 which occupies a groove 66 formed in the arm 53. The arrangement of the arms 53 and 54 is such that a uniform range of movement of the latter may effect a variable range of movement of the former. For this purpose the stud is connected by a pivoted link 67 to a gage hereinafter described.

For the purpose of imparting a cutting movement to the cutter 46, the carrier 48 is actuated by toggle links 68 and 69 of which the former is pivotally connected to the carriage 50, and the latter to the carrier. The connection with the carriage is made by a sleeve or bushing 70 eccentrically mounted on a bolt which is screw-threaded in one of the bearings 49. The connection with the carrier is made by a split collar 72 clamped thereon and having a pivoting stud 73 extending through the link 69. The links 68 and 69 are jointed by a stud 74 by which they are pivotally connected to one end of a connecting rod 75. The other end of the rod is pivoted to one arm of a bell crank lever 76 fulcrumed upon a stud 77 carried by the carriage 50. The other arm of the lever 76 is connected by a link 78 to a plunger 79 which extends through the interior of the sleeve 51 of the carriage. A forked member 80 (see Figs. 9 and 12) is swiveled upon the projecting end of the plunger and straddles the shaft 21. The said member carries a cam roll 81 which coöperates with a cam groove 82 formed in a disk 83 carried upon the shaft.

The action of the cam 82 is so timed with relation to that of the cam 59 as to cause the cutter 46 to move in a path such as that shown by Fig. 17. In this diagram the surface of the cutting plate is represented by the broken line $a$, and the line of cutting movement of the cutter is represented by the line $b$ which extends to the line $a$. The feeding movement of the cutter is represented by the line c and is caused by lateral movement of the carriage 50 while the cutter is in the work and in contact with the plate. The movement c extends to the line of the setting members 22 and 23 which is represented by the broken line d. It may be here stated that the length of the movement c is variable but that the variation affects only the right hand extreme, the left hand extreme being invariably coincident with the line d of the setting members. The means for effecting a variation is that by which the stud 61 is adjusted and is hereinafter described. The effect of the variation is to place the cutting movement b toward or from the line d, thereby reducing or increasing the length of the feeding movement c. The cutter after moving into alinement with the setting members, moves away from the cutting table in the line e, leaving the hole y in the work in position to receive an eyelet z (see Fig. 16). The cutter then moves back to the line b and at the same time partway toward the plate as indicated by the line f. The movement toward the plate is for the purpose of avoiding the setting member 22 which starts toward the plate at the instant when the cutter moves away from the line d. The cutter then moves away from the plate before entering the work again, but it moves in the same line although the two movements are represented on the drawing by separate lines.

An important feature of the cutting and feeding of the work is that the pressure of the cutter on the plate is relieved during the feeding movement. Referring now to Fig. 3, it may be seen that the joint 74 is at the rear of the center line of the pivots 71 and 73, and that the cutter is away from the plate. In Fig. 8 the joint 74 is in front of the pivots 71 and 73 and the cutter in contact with the cutting plate 47. During the forward movement of the joint 74 the cutter passes almost through the work before the joint reaches the central line, and when it reaches the line, the maximum force against the plate is exerted. The slight flexibility of the actuating members of the cutter enables the joint to pass the center line while in theory the cutter is adapted to normally engage the plate when the joint is slightly distant from the line. In practice the cutter is adjusted to so engage the plate and insure complete and clean cutting of the work. When the joint 74 moves from the central line to its forward extreme (the position shown in Fig. 8) the excess pressure stored in the flexible members is relieved, leaving the cutter in contact with the plate but not under pressure. While in this position the carriage is moved laterally to feed the work, but it is not retarded by the plate although the latter is stationary. Provision is made for bracing the carriage 50 so as to insure rigidity thereof during the cutting movement of the cutter. This consists of a stationary adjustable block 150 which is clamped against a lug 151 on the frame 20 by means of a screw bolt 152 (Figs. 1 and 3). The block has a flat face which is adapted to engage a flat face or shoulder 153 formed on the carriage (Figs. 7 and 8) parallel to the direction of its movement. Adjusting screws 154 are screw-threaded in the lug 151 and are adapted to engage the block and prevent it and the carriage from receding from the cutting plate. The block 150 is sufficiently broad to engage the shoulder 153 throughout its lateral movement.

84 represents a presserfoot which is adapted to hold the work against the table and which is so actuated as to engage the work at all times except when the work is moving laterally. At this time the presserfoot is disengaged from the work by means of a cam 99 on the shaft 21 between the cam members 60 and 83 (see Figs. 5, 10 and 11). The presserfoot (see Figs. 1 and 3) is in the form of a hooked arm and is mounted on one end of a longitudinally movable rod 85 mounted in bearings 86, 86 in the frame 20. A split collar 87 is clamped on the rod between the bearings, and a helical spring 98 surrounding the rod is interposed between the collar and one of the bearings and exerts its tension so as to normally force the presserfoot toward the table. The collar 87 has a nose with an inclined surface 88 which is adapted to be engaged by a roll 89 carried by the free end of an arm 90. (See Figs. 1, 10 and 11). The arm is affixed upon the forward end of a rock-shaft 91 and is actuated by an arm 92 on the rear end of the shaft and having a roll 93 adapted to be engaged by the cam 99. Manually operative means is also provided by which the presserfoot may be actuated independently of the cam 99. Said means comprises a lever 94 mounted upon a fulcrum stud 95 and having one arm adapted to abut against the rod 85 and another arm which may be connected by a rod 96 to a treadle (not shown). The work table is also provided with a guide or gage 97 (see Figs. 3 and 13) against which one edge of the work may be placed when it is inserted between the presserfoot and the table.

The setting member 23 is employed as a carrier for carrying the eyelets z one by one from a race to the hole y cut in the work. For this purpose the member 23 (see Fig. 19) is provided as usual with a centrally located plunger or finger 100 adapted to extend through the throat of an eyelet. The plunger has at its inner end a head 101 which is normally held against the setting member 23 by means of a helical spring 102 contained in the carrier 25. The eyelets are delivered to the member 23 by an inclined race 104 at whose upper end is a hopper 105 from which eyelets may be fed into the race by any suitable means (not shown). The race and hopper are mounted on an oscillatory hanger 106 which enables them to swing laterally so as to move the delivery end 107 of the race into and out of alinement with the member 23. The hanger 106 is mounted (see Figs. 4 and 5) between two lugs 108, 108 extending from the frame 20 and is engaged by step bearings 109, 109 threaded in the lugs.

The means for oscillating the race 104 include a bell crank lever 110, a cam 111 for operating the lever, and a universal connection between the bell crank and the hanger. The lever is mounted on a fulcrum stud 112 and has a cam roll 113 which coöperates with the cam 111 which is mounted on the shaft 21. The lever carries a fork or yoke 114 by means of a stem 115 formed thereon and extending into a bearing in the lever in which it is free to turn and to move endwise. A sleeve or collar 116 mounted in the yoke by means of trunnions 117 surrounds a pin 118 extending from the hanger 106 and completes the universal connection between the bell crank and the hanger.

The movement imparted to the delivery end of the race 104 is too well known to require description. The two positions thereof are shown by Figs. 13 to 16 which, however, do not disclose any eyelets in the race inself. In Fig. 16, the member 23 is in the act of carrying an eyelet to the work after having removed it from the race.

The means hereinbefore mentioned for changing the length of the feeding movement of the cutter may be any one of several well known forms of mechanism employed where the work is given a step by step movement. The sleeve 55 (Figs. 4, 5 and 6) having the two arms 54 and 57 receives from the feed cam 59 movements of uniform length. The movements are communicated to the arm 53 by means of the stud 61 as hereinbefore explained, but the extent of movement so communicated is determined by the position of the stud relatively to the axes of the sleeves 55 and 51. The slot 63 in the arm 54 and the groove 66 in the arm 53 adapt the arms to various positions of the stud 61. According to the arrangement shown, the stud is normally held in one position by a spring 120 and that position is determined by a fixed stop or pin 121 inserted in a gage plate 122. The pivoted link 67 connects the stud 61 with a block 123 mounted in a slot 124 formed in another plate 125 of the gage. As shown by Figs. 5 and 6 the block has arms 126 and 127 of which the latter lies against the pin 121 where it is held by the action of the spring 120. The block 123 is adapted to slide back and forth in the slot 124 and when so moved it imparts a corresponding movement to the pin 61. The means shown for moving the block is a rod or link 128 connecting it with a lever 129 (see Fig. 1) which may be operated manually if desired. One position of the block is determined by the pin 121 as already described, and the other may be determined by another pin 130 in the path of the arm 126. The plates 122 and 125 in which the pins are inserted may have a series of apertures for different locations of the pins.

It will be observed by reference to Fig. 6, that in the positions of the arms 53 and 54 the slot 63 and groove 66 are parallel. When the arms occupy this position the cutter is in alinement with the setting members, consequently these positions and the alinement of the cutter are not disturbed by changing the adjustment of the stud 61. The movement of the arm 53 from this position is, however, made more or less by moving the stud by the means described.

Having thus explained the nature of my said invention and described a way of constructing and using the same, although without attempting to set forth all of the forms in which it may be made or all of the modes of its use, I declare that what I claim is:—

1. An eyelet setting machine comprising a pair of coöperative setting members, carriers therefor movable in alinement toward and from each other, a rotatable shaft, means driven by the shaft for reciprocating one of said carriers and including means for shifting the range of movement thereof, and independent means driven by said shaft for reciprocating the other carrier, and including means for shifting the range of movement of that carrier.

2. In an eyelet setting machine, coöperative setting members, a cutting plate, a carriage movable toward and from said setting members in a plane parallel to said plate, a cutter mounted on said carriage so as to be movable to and from said plate and arranged to be moved by the carriage to and from the line of said setting members, toggle links mounted upon said carriage for actuating said cutter with relation to the carriage, means for reciprocating the carriage, and means for reciprocating said toggle links.

3. In an eyelet setting machine, coöperative setting members, a cutting plate, a carriage movable toward and from said setting members in a plane parallel to said plate, a plunger arranged in bearings on said carriage so as to be movable toward and from said plate, a cutter mounted on said plunger to engage the plate, pivot studs affixed respectively to said carriage and said plunger, toggle links embracing said pivot studs respectively, means for actuating said toggle links, and means for reciprocating said carriage to move the cutter to and from the line of the setting members.

4. In an eyelet setting machine, a combination of coöperative setting members movable in alinement with each other, and a cutter having a rectilinear cutting movement and a curvilinear movement to and from the line of the setting members.

In testimony whereof I have affixed my signature, in presence of two witnesses.

FREDERICK W. LUSCOMB.

Witnesses:
   MARCUS B. MAY,
   P. W. PEZZETTI.